Feb. 15, 1927.
L. K. HOSS
1,618,010
HEADLIGHT
Filed Oct. 9, 1925
2 Sheets-Sheet 1
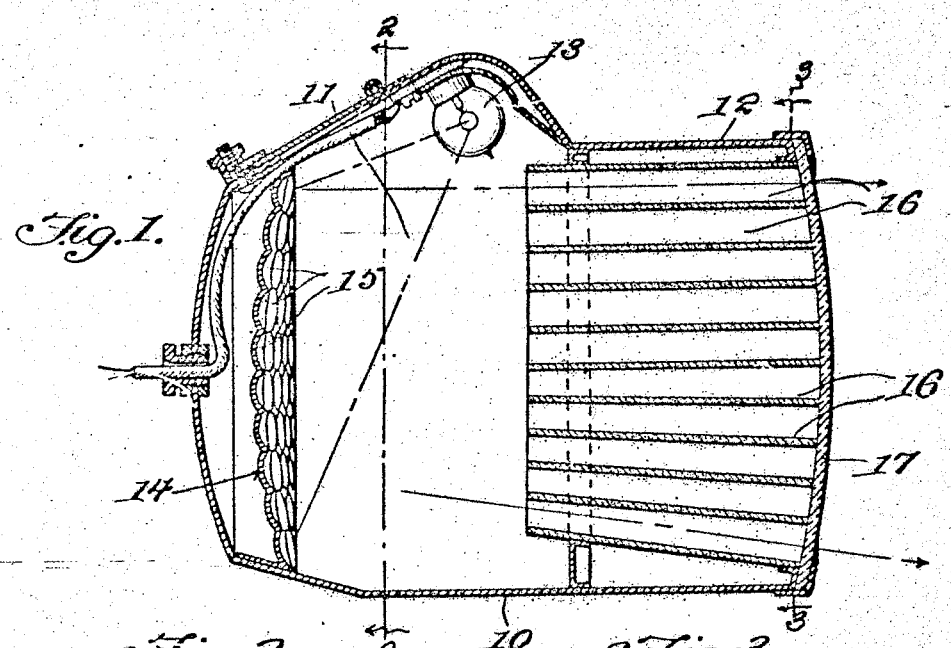
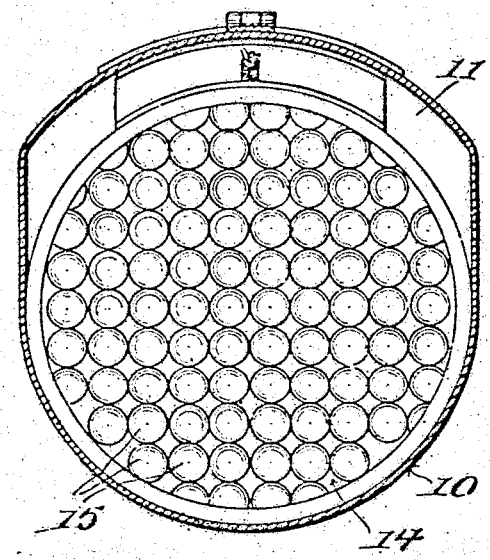
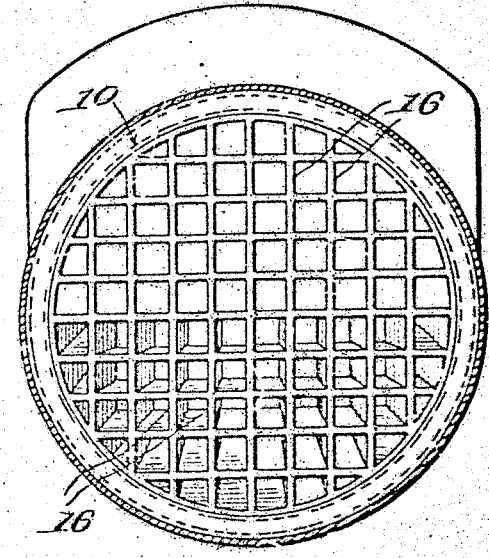
Leroy K. Hoss, INVENTOR Feb. 15, 1927.
L. K. HOSS
1,618,010
HEADLIGHT
Filed Oct. 9, 1925    2 Sheets-Sheet 2

Leroy K. Hoss
INVENTOR
BY Victor J. Evans
ATTORNEY

J. L. Wright
WITNESS:

Patented Feb. 15, 1927.

1,618,010

UNITED STATES PATENT OFFICE.

LEROY K. HOSS, OF LAKE WORTH, FLORIDA.

HEADLIGHT.

Application filed October 9, 1925. Serial No. 61,539.

This invention relates to lamps especially designed for use upon automobiles, an object being to provide an automobile headlight which will direct the rays of light downwardly and laterally in advance of the automobile and will prevent any of the rays from rising above a substantially horizontal line and will thus afford a maximum amount of light for the driver of the automobile and at the same time prevent a glaring light from interfering with the vision of approaching drivers or other persons.

Another object of the invention is the provision of a headlight which includes a multiplicity of separate light directing passages designed to direct the rays of light in a proper direction for the accomplishment of the purposes above set forth, together with a reflector which is designed to reflect the light from a suitable source into and along these passages.

With the above and other objects in view, the invention further includes the following novel features and details of construction, to be hereinafter more fully described, illustrated in the accompanying drawings and pointed out in the appended claims.

In the drawings:—

Figure 1 is a vertical sectional view of a lamp constructed in accordance with the invention.

Figure 2 is a section taken substantially on the line 2—2 of Figure 1.

Figure 3 is a similar view on the line 3—3 of Figure 1.

Figure 4:
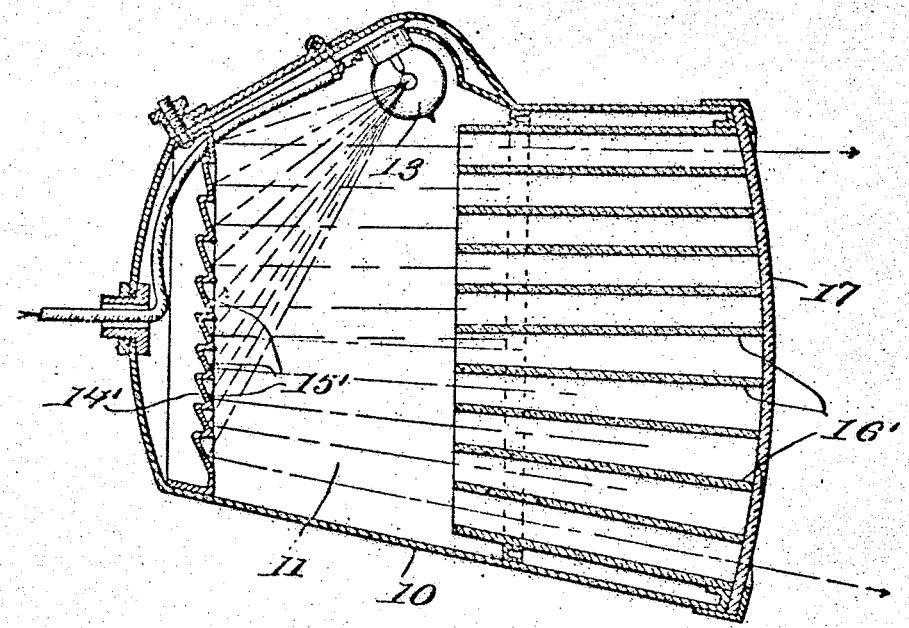
Figure 4 is a view similar to Figure 1 showing a modified form of the invention.
Figure 5:
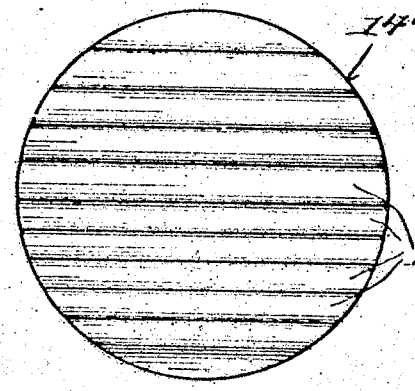
Figure 5 is an elevation of the reflector shown in Figure 4.

Referring to the drawings in detail, wherein like characters of reference denote corresponding parts, the reference character 10 indicates the casing of the lamp which is provided with a light compartment 11 and a tubular extension 12, while the reference character 13 indicates an electric bulb located within the top of the light compartment.

The rear wall of the light compartment is formed by a reflector 14 which includes a plurality of separate concaved reflecting surfaces 15 which are designed to reflect the rays of light from the bulb 13 into a plurality of separate light passages 16.

These light passages are preferably formed of green glass tubular passages, the walls of which are ground or frosted to prevent reflection of the light's rays therein and to permit the said rays to be directed longitudinally of the passages. The upper passages are substantially horizontally arranged so that the rays of light will be directed forwardly and will not rise above a substantially horizontal line. The lower edges are outwardly and downwardly flared so as to direct the rays of light from these passages laterally and forwardly so as to supply light upon the roadway in advance of and to one side of the automobile.

The passages 16 may be formed in any suitable manner but it is preferred to provide a unitary structure of substantially honeycomb formation.

Figure 6:
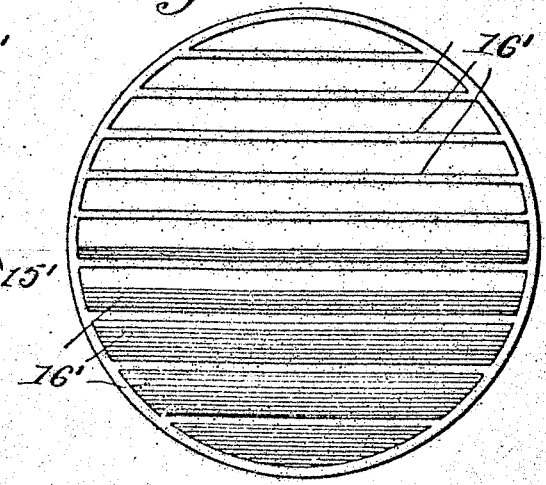
Figure 6 is a front view showing the horizontally disposed vertically spaced light passages illustrated in Figure 4.

If desired, the light passages may extend horizontally across the lamp casing as indicated at 16' in Figures 4 and 6 of the drawings, the vertical partitions being omitted. The passages 16' below the axial center of the lamp are directed downwardly so that the rays of light will be likewise downwardly directed.

The reflector 14' which is located within the lamp casing 10 is formed of a plurality of vertically spaced concaved reflecting surfaces 15' which extend horizontally across the lamp casing, one of these reflecting surfaces being provided for each light passage 16'.

If desired, the front of the casing may be closed by a glass or other transparent panel 17 so as to exclude dirt and moisture.

The invention is susceptible of various other changes in its form, proportions and minor details of construction and the right is herein reserved to make such changes as properly fall within the scope of the appended claims.

Having described the invention what is claimed is:—

1. In a lamp, a casing, a reflector disposed transversely at the rear of the casing and including a plurality of independent reflecting surfaces, a lens covering the front end of the casing, separate light passages extending inwardly from the lens an appreciable distance apart and terminating short of the reflector and a source of light located within the casing above the plane of the light passages and reflector and in advance of the latter.

2. In a lamp, a casing, a reflector disposed transversely at the rear of the casing and including a plurality of independent reflecting surfaces, a lens covering the front end of the casing, a separate light passage for each of the reflecting surfaces, with the light passages extending inwardly from the lens an appreciable distance toward and terminating short of the reflector and a source of light located within the casing above the plane of the light passages and reflector and in advance of the latter.

3. In a lamp, a casing, a reflector disposed transversely at the rear of the casing and including a plurality of independent reflecting surfaces, a lens covering the front end of the casing, separate light passages extending inwardly from the lens an appreciable distance apart and terminating short of the reflector, some of said light passages having parallel walls extending parallel with the axial center of the casing and other of said passages having their outer and bottom walls inclined laterally and downwardly and a source of light located within the casing above the plane of the light passages and reflector and in advance of the latter.

In testimony whereof I affix my signature.

LEROY K. HOSS